United States Patent
McClendon et al.

(10) Patent No.: US 9,897,207 B2
(45) Date of Patent: Feb. 20, 2018

(54) VARIABLE-VOLUME HEAD

(71) Applicant: GE Oil & Gas Compression Systems, LLC, Houston, TX (US)

(72) Inventors: Gene McClendon, Oklahoma City, OK (US); Randall A. Coleman, Oklahoma City, OK (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 136 days.

(21) Appl. No.: 14/287,011

(22) Filed: May 24, 2014

(65) Prior Publication Data

US 2014/0338526 A1    Nov. 20, 2014

Related U.S. Application Data

(63) Continuation of application No. 12/933,848, filed as application No. PCT/US2009/041468 on Apr. 22, 2009.

(Continued)

(51) Int. Cl.
 *F04B 49/16*  (2006.01)
 *F04B 53/00*  (2006.01)
 (Continued)

(52) U.S. Cl.
 CPC .......... *F16J 1/00* (2013.01); *F04B 17/05* (2013.01); *F04B 35/002* (2013.01);
 (Continued)

(58) Field of Classification Search
 CPC ........ F04B 17/05; F04B 35/002; F04B 49/16; F04B 53/007; F04B 39/125; F16J 1/00
 See application file for complete search history.

(56) References Cited

U.S. PATENT DOCUMENTS 1,586,278 A    5/1926  Bardenheuer
2,047,167 A *  7/1936  Heller ................. F04B 39/1033
                                              417/274

(Continued)

FOREIGN PATENT DOCUMENTS

GB           383363        11/1932

OTHER PUBLICATIONS

International Search Report & Written Opinion of PCT/US2009/041468 dated Jul. 15, 2009; 16 pages.

*Primary Examiner* — Peter J Bertheaud
(74) *Attorney, Agent, or Firm* — Mintz Levin Cohn Ferris Glovsky and Popeo, P.C.

(57) ABSTRACT

Disclosed is a device that includes a natural-gas compression system having a natural-gas powered combustion engine, a compression cylinder configured to receive natural gas and output compressed natural gas, a piston disposed in the compression cylinder and configured to translate through the compression cylinder in response to mechanical power received from the natural-gas powered combustion engine, and a variable-volume head mounted to the compression cylinder and configured to vary a compressed volume of the compression cylinder. In some instances, the variable-volume head includes a head body, an adjustment screw rotatably coupled to the head body, a plug moveable in threaded engagement with the adjustment screw, and an anti-rotation device coupled to the plug, the head body, or both. The anti-rotation device may be configured to impede the plug from rotating relative to the head body as the adjustment screw rotates.

26 Claims, 8 Drawing Sheets

Related U.S. Application Data

(60) Provisional application No. 61/057,790, filed on May 30, 2008.

(51) Int. Cl.
    *F04B 39/12* (2006.01)
    *F16J 1/00* (2006.01)
    *F04B 17/05* (2006.01)
    *F04B 35/00* (2006.01)

(52) U.S. Cl.
    CPC ............ *F04B 39/125* (2013.01); *F04B 49/16* (2013.01); *F04B 53/007* (2013.01)

(56) References Cited

U.S. PATENT DOCUMENTS

| | | | |
|---|---|---|---|
| 2,140,579 A * | 12/1938 | Gray | 33/284 |
| 2,342,830 A | 2/1944 | Bate | |
| 2,776,577 A | 1/1957 | Olchawa | |
| 2,855,688 A * | 10/1958 | Comstock | 33/568 |
| 3,045,892 A * | 7/1962 | White | F04B 49/16 417/274 |
| 3,174,677 A | 3/1965 | Ramstad | |
| 3,431,800 A * | 3/1969 | Lucie | 82/110 |
| 3,489,098 A | 1/1970 | Roth et al. | |
| 3,727,318 A * | 4/1973 | Meier | 33/814 |
| 3,991,478 A * | 11/1976 | Stone | 33/568 |
| 4,590,846 A * | 5/1986 | Stoll | F15B 15/1438 92/151 |
| 4,730,503 A | 3/1988 | Rosenthal | |
| 5,538,364 A * | 7/1996 | Huntsman | 405/288 |
| 5,785,505 A | 7/1998 | Price | |
| 2001/0015340 A1* | 8/2001 | Kolbel | 215/11.1 |
| 2005/0175476 A1 | 8/2005 | Patterson | |
| 2007/0046297 A1* | 3/2007 | Hariharan et al. | 324/631 |
| 2007/0243091 A1* | 10/2007 | Van Norman et al. | 418/191 |

* cited by examiner

VARIABLE-VOLUME HEAD

CROSS REFERENCE TO RELATED APPLICATIONS

This application claims priority to U.S. Non-Provisional application Ser. No. 12/933,848 entitled "Variable-Volume Head", filed on Sep. 21, 2010, which is herein incorporated by reference in its entirety, which claims priority to PCT Application No. PCT/US2009/041468 entitled "Variable-Volume Head", filed on Apr. 22, 2009, which is herein incorporated by reference in its entirety, and which claims priority to U.S. Provisional Patent Application No. 61/057,790, entitled "Variable-Volume Head", filed on May 30, 2008, which is herein incorporated by reference in its entirety.

FIELD OF THE INVENTION

Embodiments of the present invention relate generally to compressors. More particularly, some embodiments of the present invention relate to compressors having variable-volume heads.

BACKGROUND

This section is intended to introduce the reader to various aspects of art that may be related to various aspects of the present invention, which are described or claimed below. This discussion is believed to be helpful in providing the reader with background information to facilitate a better understanding of the various aspects of the present invention. Accordingly, it should be understood that these statements are to be read in this light, and not as admissions of prior art.

Reciprocating compressors are frequently used to compress and transport fluids, such as natural gas. Generally, a reciprocating compressor includes a piston and a cylinder. During compression, inlet valves temporarily open to allow the fluid to flow into the cylinder. Then, the inlet valves close, and the piston is driven through the cylinder, reducing the volume of the cylinder in which the fluid is disposed and elevating the pressure of the fluid. The change in the volume of the cylinder during the compression stroke of the piston is referred to as the "swept volume." Near the end of the piston's travel, an outlet valve is opened and the compressed fluid flows from the cylinder.

Compressors are often characterized by their volumetric compression efficiency. This parameter is the ratio of the swept volume to the total volume of the cylinder that houses the fluid being compressed. A high volumetric efficiency generally correlates with a larger outlet pressure, as a substantial portion of the volume of the cylinder is swept by the piston, and a low volumetric efficiency generally correlates with a lower outlet pressure, as the percentage reduction in the cylinder's volume during a piston stroke is lower.

The volumetric compression efficiency of a given compressor may not be matched to the system in which the compressor operates. A compressor design may be used in a variety of systems that expose the compressors to different conditions. For example, across systems, the compressor may be subject to varying inlet pressure or outlet pressure, as components upstream or downstream from the compressor may impede flow to or from the compressor to differing degrees in different applications. These variations and others can affect the performance of a compressor. Accordingly, it would be useful to be able to tune a compressor's volumetric compression efficiency according to characteristics of upstream and downstream components.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Figure 1:
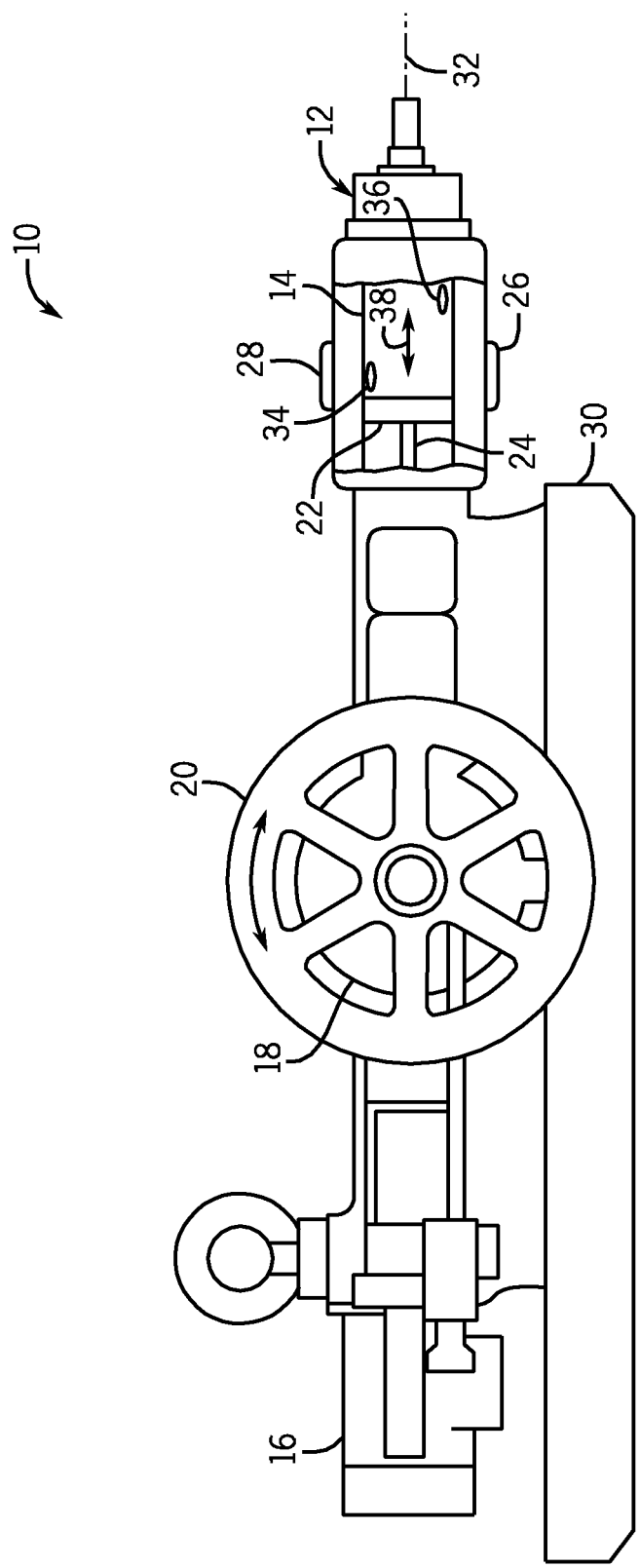
FIG. 1 illustrates a partially-sectioned elevation view of an embodiment of a compressor.

FIG. 1 illustrates an elevation view of an embodiment of a compressor 10. In this embodiment, the compressor 10 includes a variable-volume head 12 that adjusts the volume of a cylinder 14 of the compressor 10. As explained below, the variable-volume head 12 consumes relatively little space compared to conventional designs and is adjustable with relatively little force. Additionally, the illustrated variable-volume head 12 is relatively resistant to ambient corrosive elements. Not all embodiments, however, provide all of these benefits, and some embodiments may provide other benefits. Before describing the variable-volume head 12 in detail, other features of the compressor 10 are described.

The illustrated compressor 10 includes an engine 16, a crank case 18, a flywheel 20, a piston 22, a rod 24, valves 26 and 28, and a skid 30. In this embodiment, the engine 16 is a generally horizontally-mounted, internal-combustion engine with a reciprocating piston. The engine may be a spark-ignition engine or a compression-ignition engine, e.g., a diesel engine. Other embodiments may include other sources of mechanical power, such as electric motors or pneumatic drives. In operation, the engine 16 drives a rod coupled to a crankshaft in the crankcase 18 via a crosshead. The crankshaft in the crankcase 18 is coupled by an axle to the flywheel 20, which provides an inertial mass that functions as a reservoir for angular momentum. The crankshaft in the crankcase 18 is also connected to the piston 22 via the rod 24 and another crosshead. The piston 22 and the cylinder 14 have a generally complementary generally right circular cylindrical shape that is generally concentric about a central axis 32. The cylinder 14 includes inlet passages 34 and outlet passages 36 that are in fluid communication with the valves 26 and 28. The valves 26 and 28 may include a variety of types of valve members, such as a plurality of poppet valves that are biased against openings connected to the passages 34 and 36. In some embodiments, the valves 26 and 28 are check valves configured to open in response to a pressure in the cylinder greater than a threshold pressure or less than a threshold pressure.

In operation, the engine 16 drives the flywheel 20 and the piston 22. As the flywheel 20 rotates with the crankshaft in the crankcase 18, the movement of the crankshaft causes the piston 22 to oscillate axially, back and forth through the cylinder 14, as illustrated by arrow 38. While the piston 22 moves back toward the crankcase 18, the valve 28 opens in response to the drop in pressure in the cylinder 14, and fluid is drawn into the cylinder 14 through the inlet passage 34. Then, as the piston 22 translates away from the crankcase 18, the valve 28 closes in response to the increase in pressure, and the piston 22 decreases the volume of this cylinder 14 in which the fluid is disposed, thereby elevating the fluid's pressure. As noted above, the portion of the cylinder 14 through which the surface of the piston 22 translates is referred to as the swept volume of the cylinder 14. As the piston 22 nears the end of its travel away from the crankcase 18, the valve 26 opens in response to the increase in pressure, and pressurized fluid exits the cylinder 14 through the outlet passage 36. In some embodiments, the valves 26 and 28 may be pressure-actuated valves, such as check valves. For instance, the valve 28 may be a check valve configured to open in response to a fluid pressure in the cylinder 14 below some threshold, e.g., a partial vacuum, corresponding to an intake stroke, and the valve 26 may be a check valve configured to open in response to a pressure in the cylinder 14 above some threshold corresponding to the end of a compression stroke.

Figure 2:
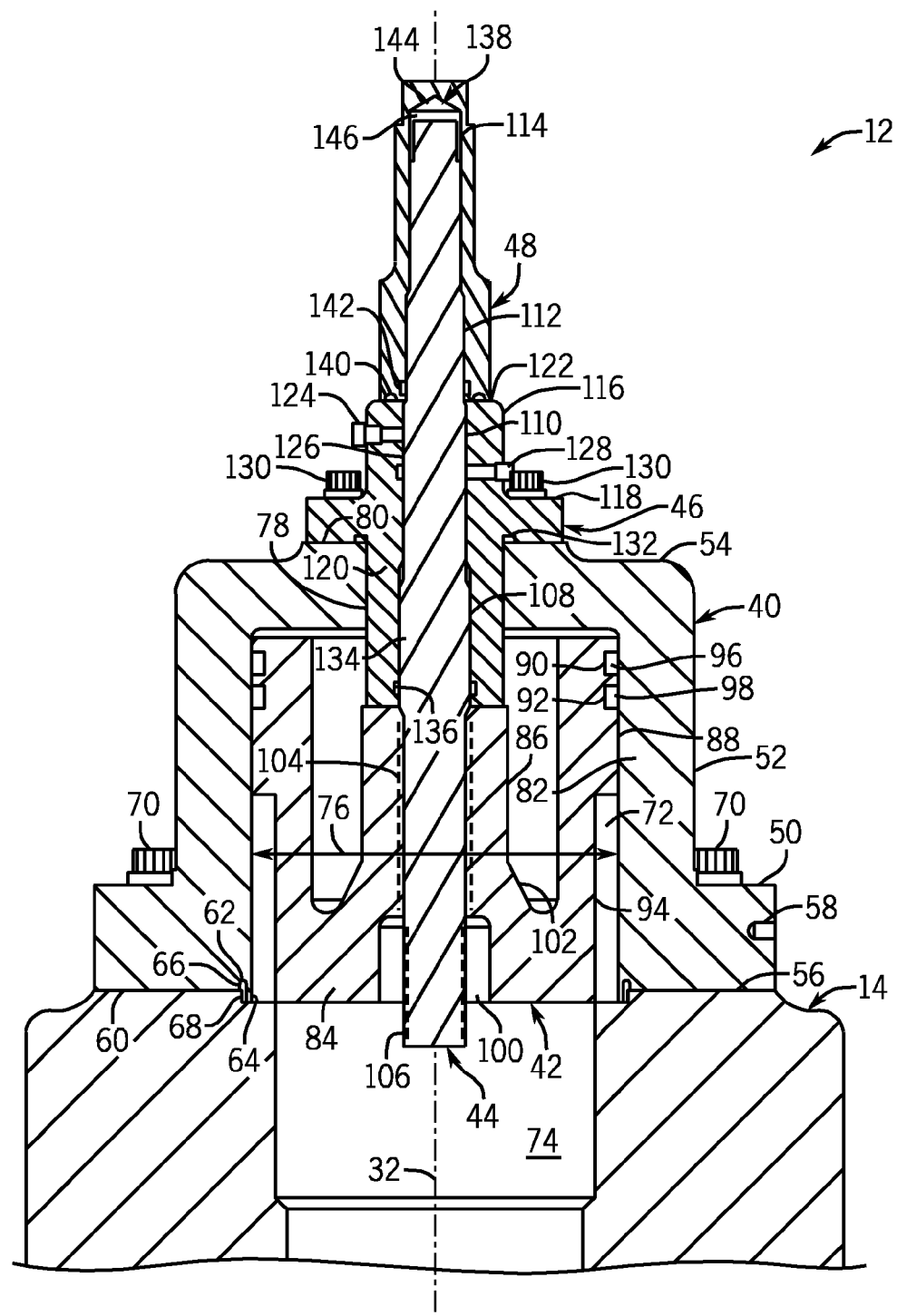
FIG. 2 illustrates a cross-sectional elevation view of an embodiment of a variable-volume head that may be included in the compressor of FIG. 1.

FIG. 2 illustrates a cross-sectional elevation view of an embodiment of the variable-volume head 12. In this embodiment, the variable-volume head 12 includes a head body 40, a plug 42, an adjustment screw 44, a collar 46, and a cap 48. Each of these illustrated components 40, 42, 44, 46, and 48 is generally concentric about the central axis 32 and is made of steel or other appropriate materials.

In the illustrated embodiment, the head body 40 includes a flange 50, a tubular portion 52, and a distal portion 54. The illustrated flange 50 is a generally annular member shaped to couple to a distal surface 56 of the cylinder 14. The flange 50 may include a threaded aperture 58 for receiving an eye-bolt or other structures configured to support the variable-volume head 12 during installation. A mating surface 60 of the flange 50 may be generally orthogonal to the central axis 32. Near the inner diameter of the mating surface 60, the illustrated flange 50 includes a groove 62 and a lip 64 that extends axially beyond the mating surface 60. A seal 66, such as an O-ring seal or a T-ring seal, is disposed in the groove 62. The lip 64 overlaps a shoulder 68 near the distal portion of the cylinder 14. A plurality of bolts 70 extend axially through the flange 50 and couple the variable-volume head 12 to threaded apertures in the cylinder 14. In other embodiments, other coupling mechanisms, such as a weld, a lock ring, or threads, may be used to secure the variable-volume head 12 to the cylinder 14.

The tubular portion 52, in this embodiment, extends generally perpendicular from the flange 50 and defines an interior 72 with a generally right-circular-cylindrical shape. The interior 72 may be generally concentric about the central axis 32 and generally coaxial with an interior 74 of the cylinder 14. In other embodiments, these volumes 72 and 74 are not coaxial or are not right circular cylinders, e.g., the variable-volume head 12 may be mounted to the side of the cylinder 14 and may extend generally radially or at an angle. The interior 72 may have a diameter 76 between about 5 inches and about 28 inches. In other embodiments, the interior 72 may have other shapes, e.g., the interior 72 may be a generally right elliptical cylinder or it may have some other curvilinear or non-curvilinear shape. The distal portion 54 extends radially inward from the tubular portion 52 and is generally orthogonal to the central axis 32. In this embodiment, the distal portion 54 includes an aperture 78 and a mating surface 80. The aperture 78 generally defines a right-circular-cylindrical volume that is generally concentric about and coaxial with the central axis 32. The illustrated aperture 78 extends through the distal portion 54 to the interior 72 of the head body 40. The mating surface 80 is generally perpendicular to the central axis 32 and is shaped to mate with a complementary surface on the collar 46.

As illustrated by FIG. 2, the plug 42 is disposed in the interior 72 of the head body 40. In some embodiments, the plug 42 includes an outer tubular member 82, a base 84, and an inner tubular member 86. The outer tubular member 82, in this embodiment, is generally concentric about, and coaxial with, the central axis 32. The outer tubular member 82 includes a sealing surface 88, generally annular grooves 90 and 92, and a recessed portion 94. The sealing surface 88 is generally complementary to the surface of the interior 72 of the head body 40. The grooves 90 and 92 house seal members 96 and 98 that are configured to seal against the surface of the interior 72 of the head body 40. In some embodiments, the seal members 96 and 98 are carbon-filled-Teflon ring seals that are biased against the surface of the interior 72 of the head body 40. The recessed portion 94 has a smaller diameter than the sealing surface 88 and is generally complementary to the interior 74 of the cylinder 14.

The illustrated base 84 extends radially between the outer tubular member 82 and the inner tubular member 86 and is generally orthogonal to the central axis 32. In this embodiment, the base 84 includes a recess 100 in which a distal portion of the adjustment screw 44 may be disposed.

In the present embodiment, the inner tubular member 86 extends generally axially from the base 84 and is generally concentric about, and co-axial with, the central axis 32. The inner tubular member 86 is disposed within the outer tubular member 82. The illustrated inner tubular member 86 includes a fillet 102 near where the inner tubular member 86 meets the base 84. A threaded aperture 104 extends through the inner tubular member 86 to the recess 100. The threaded aperture 104 is generally coaxial with, and concentric about, the central axis 32. Additional details of the plug 42 are described below with reference to FIG. 3, which illustrates a perspective view of the plug 42.

In this embodiment, the adjustment screw 44 is a generally right-circular-cylindrical member that extends generally coaxial with the central axis 32. The illustrated adjustment screw 44 extends through the plug 42, the collar 46, and into the cap 48. The presently described adjustment screw 44 includes a threaded portion 106, a sealing surface 108, another threaded portion 110, another sealing surface 112, and a tool interface 114. These features of the adjustment screw 44 are described further below with reference to FIG. 4, which illustrates a perspective view of the adjustment screw 44. With reference to FIG. 2, it should be noted that the threaded portion 106 is configured to mate with the threaded aperture 104 of the plug 42, and the threaded portion 110 is configured to mate with complementary threads on the collar 46. The sealing surface 108 is shaped to form a sliding and rotating seal with the collar 46 and the sealing surface 112 is shaped to form a generally static seal with the cap 48. In some embodiments, the sealing surfaces generally define right-circular cylindrical volumes.

In the illustrated embodiment, the collar 46 includes a tubular portion 116, a flange 118, and another tubular portion 120. The tubular portion 116 includes a distal sealing surface 122 that is generally orthogonal to the central axis 32. The illustrated tubular portion 116 also includes a breather aperture 124 that extends to a threaded aperture 126 through the collar 46 and a grease fitting 128 for lubricating the threaded aperture 126. The breather aperture 124 may include a check valve or some other device configured to relieve pressure in the threaded aperture 126. As explained below with reference to FIG. 4, which illustrates complementary structures on the adjustment screw 44, the threaded aperture 126, in this embodiment, is threaded in an opposite direction relative to the threaded aperture 104 in the plug 42. Further, as is also explained below, the threads in the threaded aperture 126 may have a finer thread pitch then the threads in the threaded aperture 104 to reduce the movement of the adjustment screw 44 relative to movement of the plug 42.

The flange 118 is a generally annular member that extends generally perpendicular to the central axis 32. A plurality of bolts 130 extend axially through the flange 118 and secure the collar 46 to threaded apertures in the head body 40. The bolts 130 also transmit loads from the plug 42 to the head body 40 via the collar 46. These forces are transmitted through the adjustment screw to the collar 46 by the coupling formed between the threaded portion 110 and the threaded aperture 126. A seal member 132, such as an O-ring seal, is biased against the mating surface 80 of the head body 40 to form a seal.

The illustrated tubular member 120 extends generally axially through the aperture 78 in the head body 40. The interior of the tubular member 120 includes a non-threaded aperture 134 that is an extension of the threaded aperture 126 and a seal member 136, such as a T-ring seal. In the state illustrated by FIG. 2, the distal portion of the tubular member 120 extends into the outer tubular member 82 of the plug 42 and abuts the inner tubular member 86. However, as explained below, the position of the plug 42 may be shifted relative to the collar 46 as the variable-volume head 12 is adjusted.

In this embodiment, the cap 48 includes an interior 138 and seals 140 and 142. The cap 48 may be threaded to the adjustment screw 44 or it may be secured to the adjustment screw 44 with a friction fit or other coupling mechanism. The interior 138 of the cap 48 includes a generally conical tip 144 and a generally right-circular-cylindrical portion 146 extending through the remainder of the cap 48. The seals 140 and 142 may include a variety of types of seals. For example, the seal 142 may be a T-ring seal, and the seal 140 may be an O-ring seal. In some embodiments, the seals 140 and 142 are formed with elastomers. The cap 48 may be removable from the adjustment screw 44 with or without tools. For example, the cap 48 of the illustrated embodiment is removable by hand. As explained below, the cap 48 may be removed to access the tool interface 114 of the adjustment screw 44. When the adjustment screw 44 is not being adjusted, the cap 48 is returned to the adjustment screw 44 to protect the adjustment screw 44 from the environment.

Figure 3:
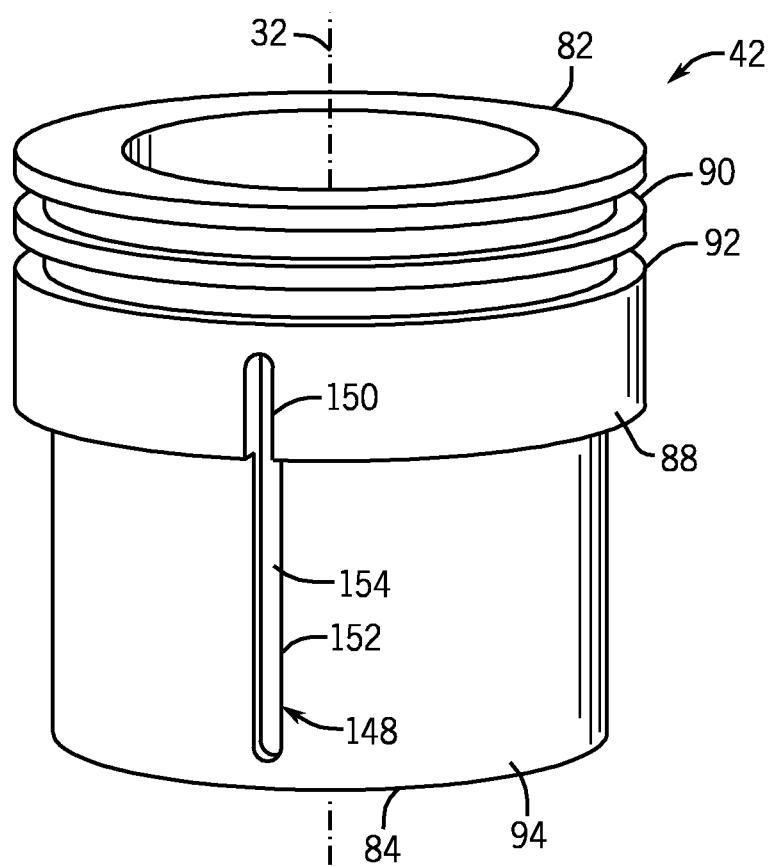
FIG. 3 illustrates a perspective view of an embodiment of a plug that may be included in the variable-volume head of FIG. 2.

FIG. 3 illustrates additional details of the plug 42. In this embodiment, the plug 42 includes a groove 148. The illustrated groove 148 is recessed generally radially into the plug 42, orthogonal to the central axis 32, and extends generally parallel to the central axis 32. The illustrated groove 148 does not penetrate entirely through the outer tubular member 82, but it does extend axially along and radially into both the sealing surface 88 and the recessed portion 94. The groove 148 includes a deeper portion 150 and a shallower portion 152 that produce a bottom surface 154 of the groove 148 that is a generally uniform distance away from the central axis 32. As explained below, the groove 148 is part of an anti-rotation device that impedes the plug 42 from rotating while allowing the plug 42 to translate axially. Some embodiments include a plurality of grooves like the groove 148 distributed around the plug 148, e.g., two grooves 180 degrees apart.

Figure 4:
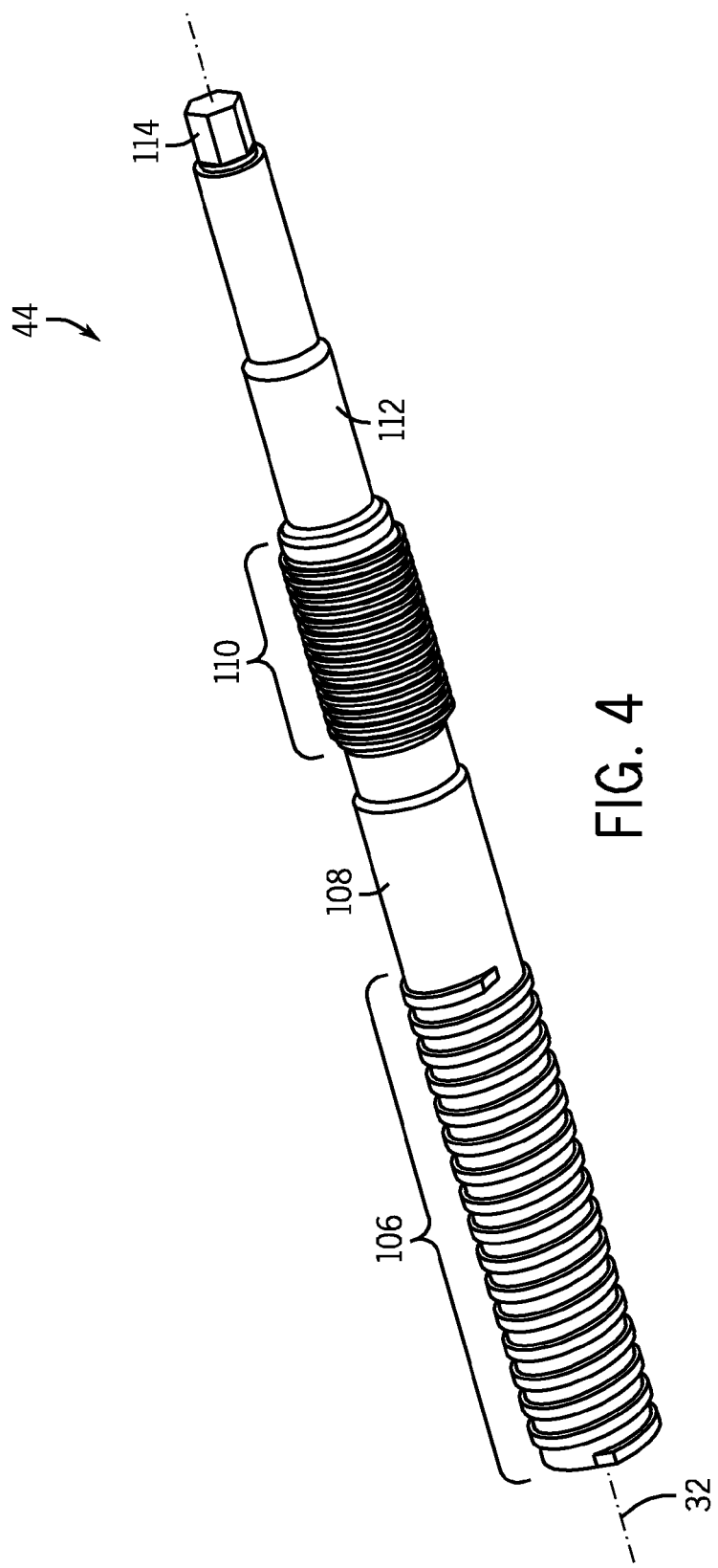
FIG. 4 illustrates a perspective view of an embodiment of an adjustment screw that may be included in the variable-volume head of FIG. 2.

FIG. 4 illustrates additional details of the adjustment screw 44. As illustrated, the threaded portion 106 and the threaded portion 110 include threads with different pitches and different orientations. In some embodiments, the threaded portion 106 is right-handed, and the threaded portion 110 is left-handed. Consequently, rotation of the adjustment screw 44 in one direction tends to bring objects coupled to the threaded portions 106 and 110 toward one another, and rotation in the other direction tends to drive those objects away from one another. In other embodiments, the orientation of the threads 106 and 110 may be reversed, or it may be the same. Having oppositely oriented threaded portions 106 and 110 is believed to enhance the mechanical advantage of the threaded couplings formed by the threaded portions 106 and 110, as both threaded portions 106 and 110 cooperate to drive the plug 42 (FIG. 2) axially. As the adjustment screw 44 is rotated, the threaded portion 110 pushes against the collar 46 (FIG. 2), and the threaded portion 110 pushes in the same direction against the plug 42 (FIG. 2).

The pitch of the threaded portion 106 may be substantially greater than the pitch of the threaded portion 110, such that a given amount of rotation of the adjustment screw 44 produces more movement in an object coupled to the threaded portion 106 than in an object coupled to the threaded portion 110. For instance, the threaded portion 110 may have more than 4 threads per inch, e.g., generally equal to 8 threads or more per inch. In addition, the threaded portion 106 may have fewer than 4 threads per inch, e.g., generally equal to or less than 2 threads per inch. As explained below, having relatively fine pitched threads on the threaded portion 110 may result in relatively little axial movement of the adjustment screw 44 through the collar 80 (FIG. 2) during adjustment, thereby reducing the volume of space consumed by the variable-volume head 12 (FIG. 2) as the adjustment screw 44 is adjusted between its maximum and minimum positions. Further, including relatively coarse threads in the threaded portion 106 tends to produce a relatively large movement of the plug 42 (FIG. 2) for a given amount of rotation of the adjustment screw 44, which also tends to reduce the amount of space consumed by the variable-volume head 12, as the plug 42 (FIG. 2) can reach its maximum and minimum positions with relatively little movement of the adjustment screw 44.

In some embodiments, the adjustment screw 44 does not translate axially as it rotates. For example, the threaded portion 110 may be omitted (which is not to suggest that other features may not also be omitted), and an annular flange may extend generally radially from the adjustment screw 44 near where the threaded portion 110 is positioned. The flange may mate with an annular groove in the collar 46 (FIG. 2), and together, these components may allow the adjustment screw 44 to rotate while generally axially constraining the adjustment screw 44. In another example, the adjustment screw 44 may include an annular groove, and the collar 46 (FIG. 2) may include an annular flange that extends generally radially inward into the groove, thereby impeding axial movement of the adjustment screw 44 while allowing rotation.

Figure 5:
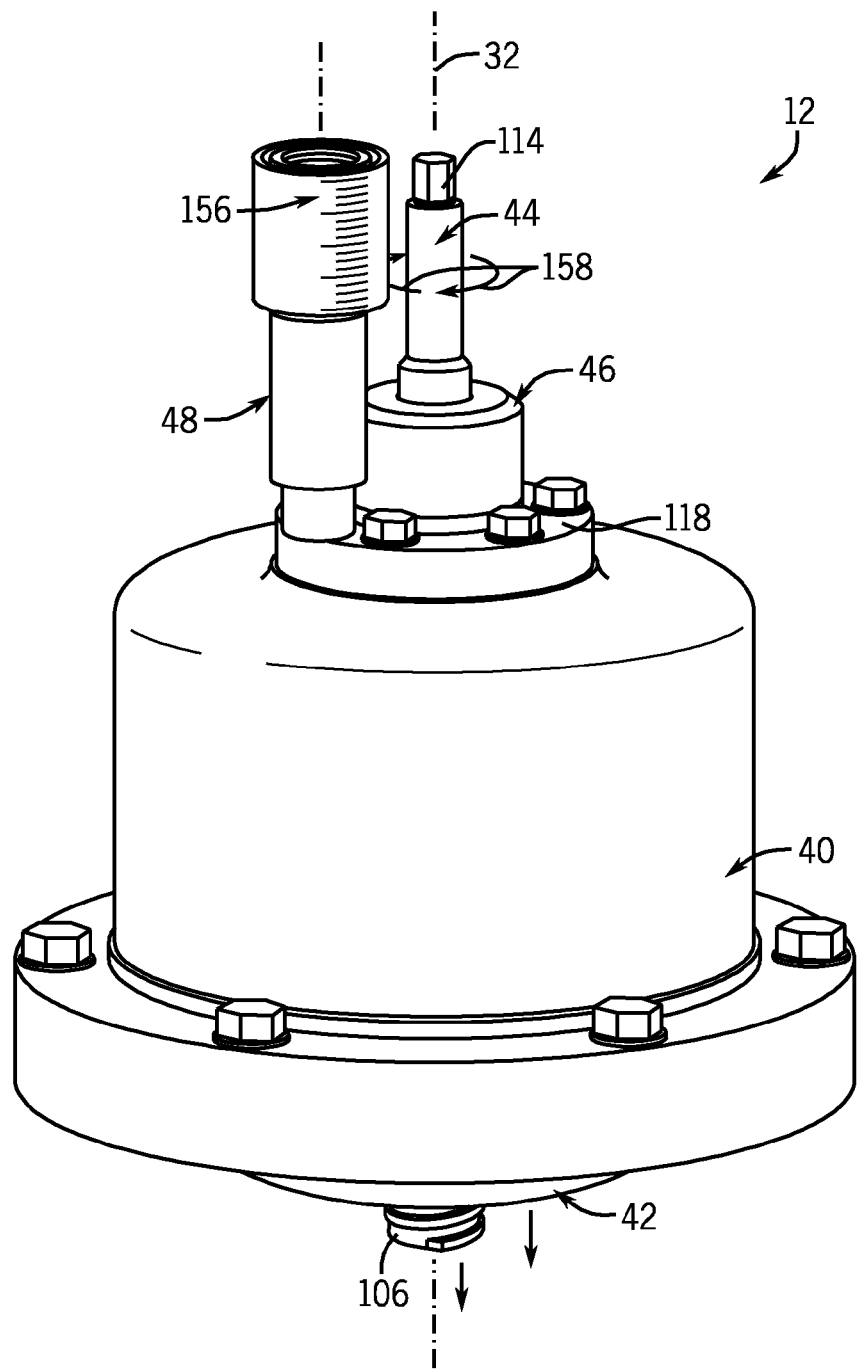
FIG. 5 illustrates a perspective view of the variable-volume head of FIG. 2 being adjusted in accordance with an embodiment of the present technique.

FIG. 5 illustrates the variable-volume head 12 being adjusted. To shift the position of the plug 42, and thereby adjust the volume of the interior 74 of the cylinder 14 (FIG. 2), the cap 48 is removed, and the adjustment screw 44 is rotated. In some embodiments, the cap 48 is removed by un-threading the cap 48 from the adjustment screw 44, or in other embodiments, the cap 48 is removed by applying an axial force to the cap 48 and overcoming friction that secures the cap 48 to the adjustment screw 44.

In some embodiments, the cap 48 includes a gauge 156 that correlates axial movement of the adjustment screw 44 with changes in the volume of the interior 74 of the cylinder 14 (FIG. 2) produced by movement of the plug 42. To use the gauge 156, the cap 48 is inverted and placed on the flange 118 of the collar 46 to axially align the gauge 156 with the variable-volume head 12. Then, an initial volume of the interior 74 of the cylinder 14 (FIG. 2) is determined by identifying which mark on the gauge 156 corresponds with an indicator on the adjustment screw 44, such as the top of the adjustment screw 44.

Figure 6:
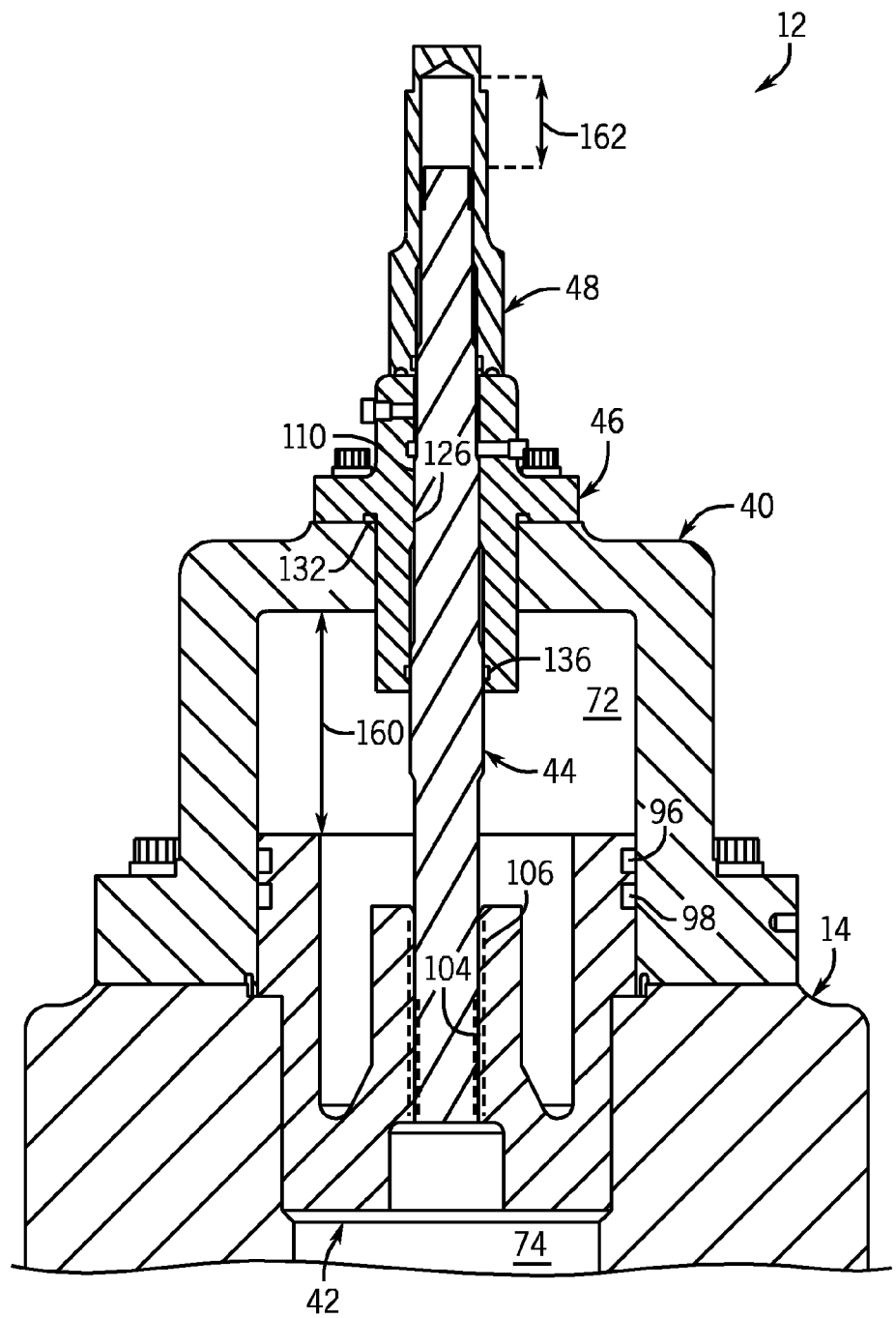
FIG. 6 illustrates a cross-sectional elevation view of the variable-volume head of FIG. 2 adjusted to increase volumetric compression efficiency in accordance with an embodiment of the present technique.

After taking an initial reading, the adjustment screw 44 is rotated to shift the position of the plug 42. The range of motion of the plug 42 is illustrated by FIGS. 2 and 6, which illustrate the plug 42 retracted and extended, respectively. The adjustment screw 44 may be rotated manually by applying a tool, such as a wrench or a wheel, to the tool interface 114 and rotating the tool about the axis 32, as indicated by arrows 158 in FIG. 5. In some embodiments, the adjustment screw 44 may be rotated with a powered device, such as an electric motor or a pneumatic motor. As the adjustment screw 44 is rotated, the threaded portion 110 (FIG. 4) cooperates with the threaded aperture 126 (FIG. 2) to axially shift both the adjustment screw 44 and the plug 42 (FIG. 6). As the adjustment screw 44 rotates and translates axially, it both carries the plug 42 and rotates within the plug 42. The plug 42 is impeded from rotating with the adjustment screw 42 by a member, such as a guide pin (an example of which is described below with reference to FIG. 7), disposed in the groove 148 and mounted to the head body 40. The rotation of the threaded portion 106 within the threaded aperture 104 (FIG. 2) of the plug 42 causes the plug 42 to translate axially along the adjustment screw 44, which is itself also translating axially due to the threaded portion 110 (FIG. 4). Thus, the axial movement of the adjustment screw 44 relative to the collar 46 and the axial movement of the plug 42 relative to the adjustment screw 44 add together to yield a net movement of the plug 42 that is larger than either individual axial movement.

After adjusting the adjustment screw 44, the gauge 156 (FIG. 5) may be used to determine the change in volume of the interior 74 of the cylinder 14 (FIG. 2). The new axial position of the adjustment screw 44 is correlated with a volume of the interior 74 by positioning the cap 48 on the flange 18 (FIG. 2) and determining which mark on the gauge 156 generally corresponds with a given point on the adjustment screw 44. The mark indicates the volume of the interior 74 (FIG. 2) corresponding to the position of the adjustment screw 44.

As mentioned above, the range of movement of the plug 42 is illustrated by comparing FIG. 2 and FIG. 6. FIG. 2 illustrates the plug 42 in its retracted position. In the retracted position, the volume of the interior 74 of the cylinder 14 is generally increased or maximized. As a result, in the state illustrated by FIG. 2, the compressor 10 (FIG. 1) operates with a relatively low, e.g., minimized, volumetric compression efficiency. In the equation for volumetric compression efficiency, i.e., the swept volume divided by the total volume of the cylinder 14 (FIG. 1), the denominator is increased by retracting the plug 42 to the state illustrated by FIG. 2. That is, the total volume is increased in the state illustrated by FIG. 2. Thus, retracting the plug 42 and increasing the volume of the cylinder 14 reduces the volumetric compression efficiency, as the swept volume remains generally constant and the total volume of the cylinder is increased.

In contrast, FIG. 6 illustrates the plug 42 in its extended position. In this state, the plug 42 has penetrated into the interior 74 of the cylinder 14, and as a result, the volume of the interior 74 is reduced. Decreasing the volume of the interior 74 increases, e.g., maximizes, the volumetric compression efficiency of the compressor 10 (FIG. 1), as the denominator in the equation for volumetric compression efficiency is reduced by reducing the total volume of the interior 74. That is, while the swept volume may remain generally constant, the total volume decreases.

As illustrated by FIG. 6, the plug 42 moves a larger axial distance 160 than the axial distance 162 moved by the adjustment screw 44. This is due to the difference in the thread pitch of the threaded portions 106 and 110 (FIG. 4). In some embodiments, the distance 160 is larger than or generally equal to 2 times the distance 162, 3 times the distance 162, 4 times the distance 162, or five times the distance 162.

The seals 96 and 98 and the threaded coupling between the threaded portion 106 and the threaded aperture 104 may impede or seal fluids from flowing between the interior 74 of the cylinder 14 and the interior 72 of the head body 40. Should the pressure in the interior 72 rise, the seals 136 and 132 tend to prevent that pressure from driving fluid to the atmosphere.

Further, the threaded coupling between the relatively fine threads of the threaded portion 110 and the threaded aperture 126 in the collar 46 are believed to prevent debris from penetrating the collar 46 and entering the interior 72 of the head body 40. This is believed to extend the useful life of the variable-volume head 12.

Figure 7:
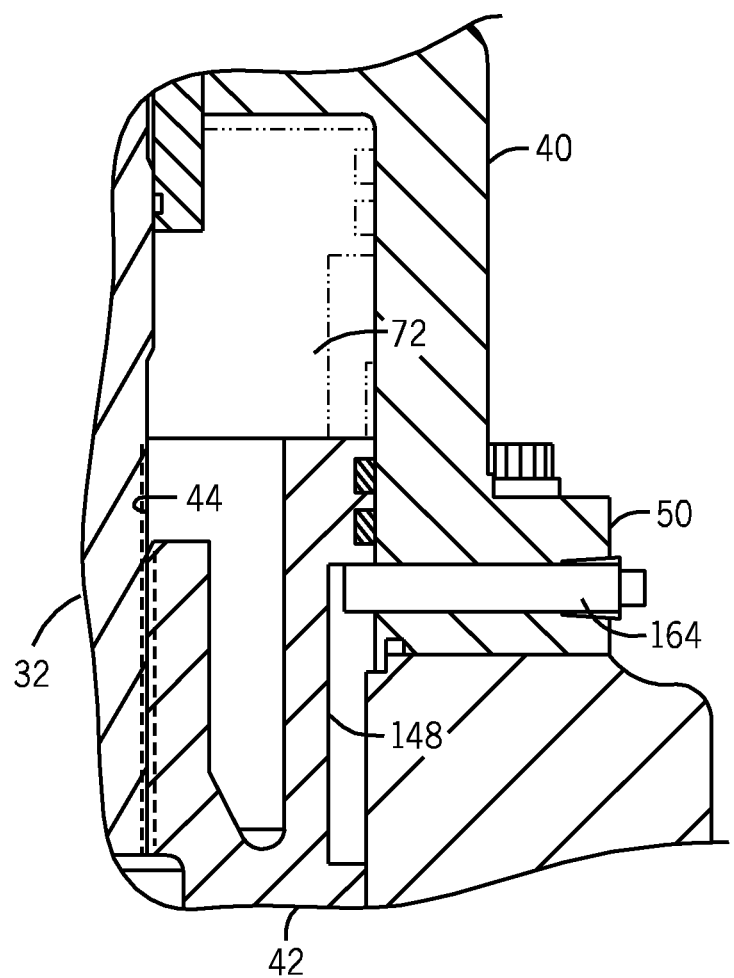
FIG. 7 illustrates another cross-sectional elevation view that is generally orthogonal to the views of FIGS. 2 and 6.

FIG. 7 illustrates another cross-section of the variable-volume head 12 that is generally orthogonal to the view illustrated by FIG. 6. This view illustrates the operation of the groove 148 and a guide pin 164 to impede the plug 42 from rotating with the adjustment screw 44. The illustrated guide pin 164 is a generally right-circular-cylindrical member that radially extends through the flange 50, generally orthogonal to the central axis 32 into the groove 148. The guide pin 164 applies a torque to the sidewalls of the groove 148 to impede or prevent the plug 42 from rotating. The guide pin 164 translates axially through the groove 148 as the plug 42 translates axially. In some embodiments, the plug 42 may be characterized as having a single degree of freedom relative to the head body 40. Some embodiments may include multiple grooves and guide pins. For example, another groove and guide pin may be disposed opposite the guide pin 164 and groove 148, e.g., about 180 degrees around the plug 42.

The groove 148 and guide pin 164, together, may be referred to as an anti-rotation device. Other embodiments may include other types of anti-rotation devices. For example, the plug 42 and interior 72 may have a generally non-circular shape, such as a generally right-elliptical-cylindrical shape, that tends to impede rotation about the central axis 32. In another example, the guide pin 164 may be positioned on the plug 42, near the distal portion of the plug 42, extending generally radially outward, and the groove 148 may be disposed in the inner walls of the cylinder 14 (FIG. 2). In some embodiments, the groove 148 is not necessarily straight, e.g., the groove 148 may spiral, causing the plug 42 to rotate as it translates axially, though the rotation may be less than the rotation of the adjustment screw 44.

Figure 8:
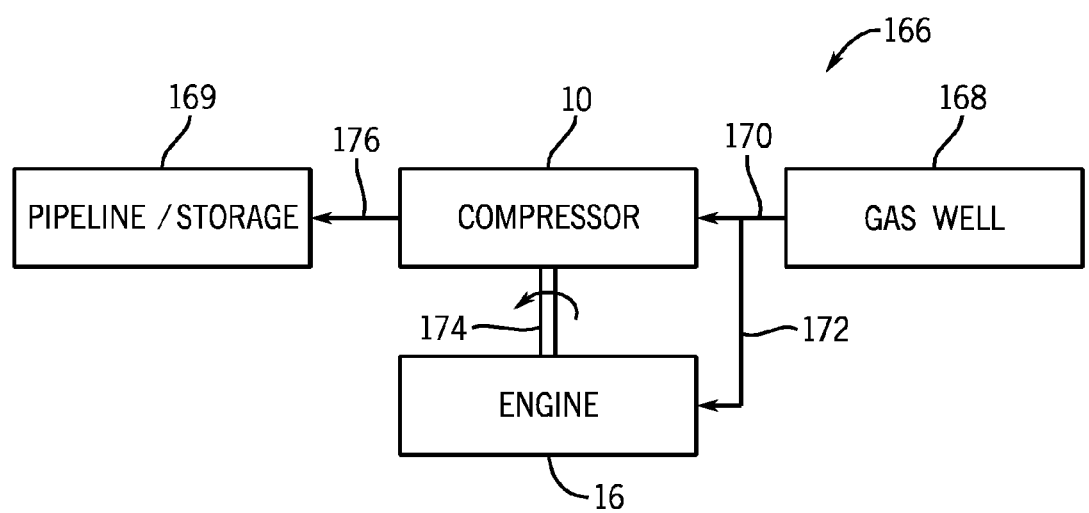
FIG. 8 illustrates a block diagram of an embodiment of a gas-compression system.

FIG. 8 illustrates an example of a compression system 166 that includes the variable-volume head 12 described above. The system 166 includes a natural-gas well 168, the engine 16, a compressor 10 that includes the above-described variable-volume head 12 (FIG. 2), and a pipeline, storage, or other fluid destination 169. The gas well 168 may be a subsea or a surface natural gas well. The engine 16 may be a two-stroke combustion engine having between 40 and 800 hp, e.g., between 40 and 200 hp.

In operation, natural gas flows from the gas well 168 to the compressor 10, as illustrated by arrow 170. A portion of this flow is diverted to the engine 16, as illustrated by arrow 172. The diverted flow of 172 may be conditioned by removing moisture or changing the gas pressure before being introduced to the engine 16. The engine 16 combusts the diverted fuel 172 and drives a shaft 174 or other mechanical linkage, such as a crankshaft and rods, that powers the compressor 10. The compressor 10 compresses the flow 170 from the gas well 168 and produces an outlet flow 176 at a higher pressure. The volumetric compression efficiency of the compressor 10 may be adjusted with the variable-volume head 12 (FIG. 2) to account for the pressure of the inlet flow 170 or the outlet flow 176. The outlet flow 169 flows to a fluid destination, such as a pipeline, storage, refining equipment, or other fluid destinations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a variable-volume head, comprising:
a head body including a tubular portion defining an interior volume, a distal portion extending radially inward from the tubular portion, and an aperture extending through the distal portion;
a collar that extends through the aperture and is partially disposed within the interior volume of the head body, wherein the head body and the collar are coaxial;
a plug movably disposed in the interior volume of the head body; and
an adjustment shaft comprising a first threaded portion coupled to the plug at a first thread interface, a second threaded portion coupled to the collar at a second thread interface, and a first sealing portion disposed axially between the first threaded portion and the second threaded portion wherein the first sealing portion forms a sliding and rotating seal with the collar.

2. The system of claim 1, comprising a piston-cylinder assembly having a piston disposed in a cylinder, wherein the variable-volume head is coupled to the piston cylinder assembly.

3. The system of claim 2, comprising a compressor having the variable volume head and the piston-cylinder assembly.

4. The system of claim 1, comprising a first seal disposed circumferentially about the adjustment shaft along the first sealing portion.

5. The system of claim 4, comprising a second seal disposed circumferentially about the adjustment shaft along a second sealing portion, wherein the second threaded portion is disposed axially between the first and second sealing portions.

6. The system of claim 1, wherein the first threaded portion has a first thread pitch, the second threaded portion has a second thread pitch, and the first and second thread pitches are different from one another.

7. The system of claim 6, wherein the first thread pitch has a first number of threads per inch, the second thread pitch has a second number of threads per inch, and the first number of threads per inch is less than the second number of threads per inch.

8. The system of claim 7, wherein a pitch ratio of the first number of threads per inch of the first thread pitch relative to the second number of threads per inch of the second thread pitch is equal to or less than 1:2.

9. The system of claim 7, wherein a pitch ratio of the first number of threads per inch of the first thread pitch relative to the second number of threads per inch of the second thread pitch is equal to or less than 1:4.

10. The system of claim 7, wherein the first number of threads per inch of the first thread pitch is less than 4 threads per inch.

11. The system of claim 7, wherein the first number of threads per inch of the first thread pitch is less than 2 threads per inch.

12. The system of claim 7, wherein the first threaded portion has a first thread orientation, the second threaded portion has a second thread orientation, and the first and second thread orientations are opposite from one another.

13. The system of claim 12, wherein the first thread orientation is a left hand thread orientation and the second thread orientation is a right hand thread orientation.

14. The system of claim 12, wherein the first thread orientation is a right hand thread orientation and the second thread orientation is a left hand thread orientation.

15. The system of claim 1, comprising an axial guide configured to enable axial movement and block rotation of the plug.

16. A system, comprising:
a piston-cylinder assembly configured to compress a fluid;
a variable-volume head coupled to the piston-cylinder assembly and configured to adjust a volumetric compressor efficiency, comprising:
    a head body enclosing an interior volume;
    a collar partially disposed within the interior volume of the head body, wherein the head body and the collar are coaxial;
    a plug movably disposed in the head body; and
    an adjustment shaft comprising a first threaded portion coupled to the plug at a first thread interface and a second threaded portion coupled to the collar at a second thread interface, wherein the first threaded portion has a first thread pitch with a first number of threads per inch, the second threaded portion has a second thread pitch with a second number of threads per inch, and the first number of threads per inch of the first thread pitch is less than the second number of threads per inch of the second thread pitch.

17. The system of claim 16, comprising a first sealing portion disposed axially between the first threaded portion and the second threaded portion.

18. The system of claim 16, wherein a pitch ratio of the first number of threads per inch of the first thread pitch relative to the second number of threads per inch of the second thread pitch is equal to or less than 1:2.

19. The system of claim 16, wherein the first threaded portion has a first thread orientation, the second threaded portion has a second thread orientation, and the first and second thread orientations are opposite from one another.

20. The system of claim 16, wherein the first threaded portion and the second threaded portion each contribute to a relative axial displacement of the plug relative to the head body in response to rotation of the adjustment shaft, wherein the relative axial displacement includes a first relative axial displacement between the first threaded portion and the plug and a second relative axial displacement between the second threaded portion and the head body, and wherein the first relative axial displacement is greater than the second relative axial displacement.

21. A system, comprising:
a compression cylinder having a reciprocating piston received within a cylinder interior;
a variable volume head coupled to an end of the compression cylinder opposite the piston, the head including:
    a body defining a body interior in fluid communication with the cylinder interior,
    an adjustment screw positioned within the body interior and having a first threaded portion and a second threaded portion,
    a non-rotatable plug positioned within the body interior and threadingly engaged with the first threaded portion, and
    a collar coupled to an end of the body opposite the plug and including an aperture extending axially therethrough, wherein the collar is rotationally fixed and wherein a portion of the aperture is threadingly engaged with the second threaded portion;
wherein rotation of the adjustment screw causes the plug to translate axially, between an extended position where the plug penetrates into the cylinder interior and a retracted position where the plug is withdrawn into the body interior and abuts the collar, to adjust a volume of the cylinder interior.

22. The system of claim 21, wherein a pitch of the first threaded portion and a pitch of the second threaded portion are different and configured to such that the plug moves a larger axial distance than the axial distance moved by the adjustment screw.

23. The system of claim 21, wherein a handedness of the second threaded portion is opposite from the first threaded portion.

24. The system of claim 21, wherein the plug includes an inner tubular member, an outer tubular member radially offset from the inner tubular member, and a base extending radially therebetween.

25. The system of claim 24, wherein the first threaded portion of the adjustment screw is threadingly engaged with the inner tubular member.

26. The system of claim 24, wherein the inner tubular member abuts the collar in the retracted position of the plug.

* * * * *